United States Patent
Benedetti et al.

(10) Patent No.: US 8,051,539 B2
(45) Date of Patent: Nov. 8, 2011

(54) BLADE FASTENER FOR TRIM MEMBER

(75) Inventors: Steven M. Benedetti, Sterling Heights, MI (US); Daniel J. Lubera, Macomb Township, MI (US); Jeffrey A. Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 833 days.

(21) Appl. No.: 12/128,203

(22) Filed: May 28, 2008

(65) Prior Publication Data

US 2009/0293237 A1 Dec. 3, 2009

(51) Int. Cl.
*F16B 17/00* (2006.01)
(52) U.S. Cl. .......... 24/294; 411/508; 411/903; 411/913
(58) Field of Classification Search .................. None
See application file for complete search history.

(56) References Cited

U.S. PATENT DOCUMENTS

| | | | |
|---|---|---|---|
| 2,193,306 A | 3/1940 | Tinnerman | |
| 2,305,122 A | 12/1942 | Wiley | |
| 2,708,779 A | 5/1955 | Tiger | |
| 3,224,047 A | 12/1965 | Horton | |
| 3,771,834 A | 11/1973 | Kretschmer | |
| 3,794,385 A | 2/1974 | Kretschmer | |
| 3,876,257 A | 4/1975 | Buerger | |
| 3,970,346 A | 7/1976 | Kretschmer | |
| 4,149,754 A | 4/1979 | Beisch et al. | |
| 4,184,299 A | 1/1980 | East | |
| 4,328,997 A | 5/1982 | Connell | |
| 4,427,238 A | 1/1984 | Connell | |
| 4,461,514 A | 7/1984 | Schwarz | |
| 4,506,419 A * | 3/1985 | Mitomi | 24/297 |
| 4,593,441 A | 6/1986 | St. Louis | |
| 4,884,851 A | 12/1989 | Hempelmann et al. | |
| 6,453,522 B1 | 9/2002 | Romero Magarino et al. | |
| 6,481,682 B2 * | 11/2002 | Miura | 248/231.9 |
| 7,134,170 B2 * | 11/2006 | Gibbons et al. | 24/289 |
| 7,179,013 B2 | 2/2007 | Benedetti | |
| 7,186,051 B2 | 3/2007 | Benedetti et al. | |
| 7,204,000 B2 | 4/2007 | Benedetti et al. | |
| 7,757,997 B2 * | 7/2010 | Smutny et al. | 248/71 |
| 2004/0223805 A1 * | 11/2004 | Benedetti et al. | 403/316 |

* cited by examiner

*Primary Examiner* — Jack W. Lavinder
(74) *Attorney, Agent, or Firm* — Harness, Dickey & Pierce, P.L.C.

(57) ABSTRACT

A fuse-shaped fastener provides a plastic member having opposed elastically flexible wings, and a metal insert having multiple barbs. The deflectable wings homogenously extend from a molded head and are distally connected by a joining member. The barbs engage within a trim component doghouse assembly. The deflectable wings extend outwardly of the trim component to releasably connect the trim component to an automobile vehicle panel.

11 Claims, 9 Drawing Sheets

BLADE FASTENER FOR TRIM MEMBER

FIELD

The present invention relates generally to fasteners and more specifically to a fastener design for joining trim pieces to the interior surfaces of automobiles.

BACKGROUND

The statements in this section merely provide background information related to the present invention and may not constitute prior art.

For automotive applications, fasteners are used to join trim components to sections or metal body panels of the automobile. The requirements for these fasteners are that they be insertable into apertures of the automobile and meet requirements to both retain the trim component as well as provide a minimum pullout retention force such that the trim component can be removed without damaging the vehicle panel. Common fastener designs include opposed deflectable wings which include free ends which deflect inwardly or toward each other upon insertion of the fastener and expand by spring force to hold the fastener within a rectangular slot in the automobile.

A drawback of commonly used fasteners having metal deflectable wings is the metal can damage the coating(s) applied to the vehicle panel during insertion which can lead to corrosion problems. All-plastic fasteners have therefore been developed to mitigate damage to the vehicle panel. A drawback of all plastic fasteners is the inability to match the repeated pull-out or retention force developed by metal fasteners.

SUMMARY

According to several embodiments of the present invention, a metal/plastic fastener includes a metal body portion having parallel first and second perimeter members perpendicularly oriented with respect to third and fourth perimeter members, and a central aperture created by the first, second, third, and fourth perimeter members. A polymeric portion includes: an end member having the third perimeter member completely embedded therein; a lead member having a portion of the fourth perimeter member embedded in the lead member; and oppositely directed first and second elastically deflectable wings each homogenously connected to both the lead member and the end member and elastically deflectable in the central aperture.

According to other embodiments, a metal/plastic fastener includes a metal body having parallel first and second perimeter members perpendicularly oriented with respect to third and fourth perimeter members. The first, second, third, and fourth perimeter members define a central aperture. The third perimeter member has contiguous third perimeter surfaces. The fourth perimeter member has contiguous fourth perimeter surfaces. A polymeric member includes a head member entirely encapsulating the third perimeter member and in contact with all of the third perimeter surfaces. A connecting member has the fourth perimeter member partially embedded in the connecting member. Oppositely directed first and second elastically deflectable wings each homogenously connect to both the head member and the connecting member.

According to other embodiments, a metal/plastic fastener system adapted to connect to a trim component includes a fastener assembly including a metal body portion having parallel first and second perimeter members perpendicularly oriented with respect to third and fourth perimeter members, and a central aperture. A polymeric portion includes: a lead member; an end member having the second perimeter member completely embedded therein; and oppositely directed first and second elastically deflectable wings each homogenously connected to both the lead member and the end member and elastically deflectable within the central aperture. A trim component has a receiving portion, the receiving portion including a cavity adapted to slidably receive the metal body portion and the polymeric portion until the end member contacts the receiving portion. A second portion of the metal body portion of the fastener assembly not embedded in the end member is entirely enclosed within the receiving portion in an installed position.

According to other embodiments, a metal/plastic fastener system includes a trim component having a receiving portion. The receiving portion includes a cavity adapted to slidably receive the metal body portion and the polymeric portion until the end member contacts the receiving portion defining an installed position. A first portion of the first deflectable wing protrudes outwardly from a first elongated aperture of the receiving portion and a second portion of the second deflectable wing protrudes outwardly from a second elongated slot of the receiving portion in the installed position. The first and second portions of the first and second deflectable wings are elastically deflectable toward each other when the subassembly is slidably received in an aperture of a vehicle body panel and are elastically deflectable to an original extended orientation having the first and second portions of the first and second wings adapted to engage the vehicle body panel to resist removal of the subassembly from the vehicle body panel.

According to still further embodiments, a method for manufacturing a metal/plastic fastener includes stamping material from a metal strip to create multiple ones of the metal bodies with proximate ones homogenously connected by a connecting member; inserting the metal strip into a mold; and injecting a polymeric material into the mold at each of the metal bodies creating the end member having the third perimeter member completely embedded in the end member and the lead member having a portion of the fourth perimeter member embedded in the lead member, and homogenously connecting the first and second elastically deflectable wings to both the lead member and the end member.

Further areas of applicability will become apparent from the description provided herein. It should be understood that the description and specific examples are intended for purposes of illustration only and are not intended to limit the scope of the present invention.

DRAWINGS

The drawings described herein are for illustration purposes only and are not intended to limit the scope of the present disclosure in any way.

DETAILED DESCRIPTION

Figure 1:
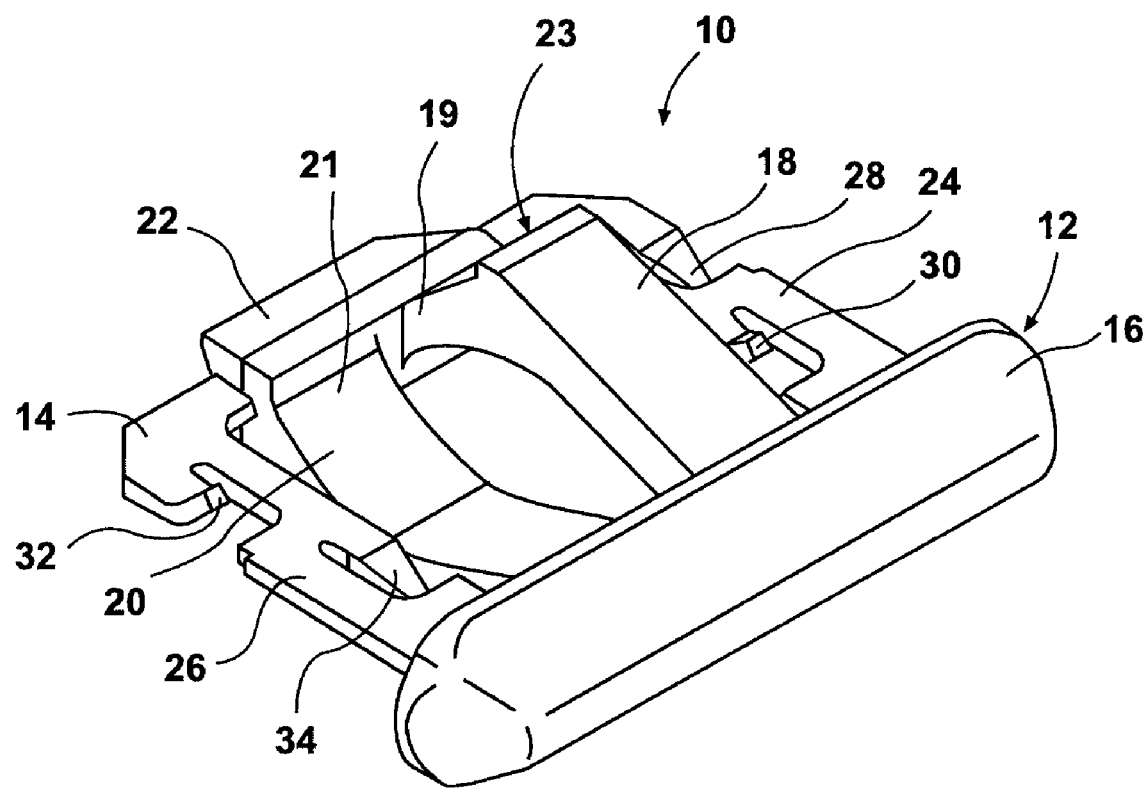
FIG. 1 is an end perspective view of a fastener assembly of the present invention.

The following description is merely exemplary in nature and is not intended to limit the present invention, application, or uses. It should be understood that throughout the drawings, corresponding reference numerals indicate like or corresponding parts and features.

Referring to FIG. 1, a fastener created as a fastener assembly 10 includes a polymeric material molded portion 12 having a metal body or insert portion 14 partially embedded in different sections of molded portion 12. Molded portion 12 includes an end member or head 16 and oppositely directed first and second elastically deflectable wings 18, 20 each having a curved shape. Oppositely directed first and second flexible wings 18, 20 homogenously extend from head 16. First and second flexible wings 18, 20 can both elastically flex inwardly toward each other. Molded portion 12 also includes a lead member or connecting end 22 having first and second ends 19, 21 of the first and second deflectable wings 18, 20 homogenously connected to the connecting end. The deflectable wings 18, 20 are shown positioned in a non-deflected or as-molded position. Stepped engagement faces 23, 23' (only stepped engagement face 23 is clearly visible in FIG. 1) of each of the deflectable wings 18, 20 are adapted to engage a panel face of a vehicle panel (not shown).

Metal insert portion 14 includes opposed first and second sides 24, 26, each having an oppositely oriented pair of first and second bite members or barbs 28, 30 and an oppositely oriented pair of third and fourth bite members or barbs 32, 34 respectively. Fastener assemblies 10 of the present invention are also referred to as "fuse" shaped meaning they are adapted to be slidably inserted into a female receiving member similar to automotive electrical fuses received in fuse boxes.

Figure 2:
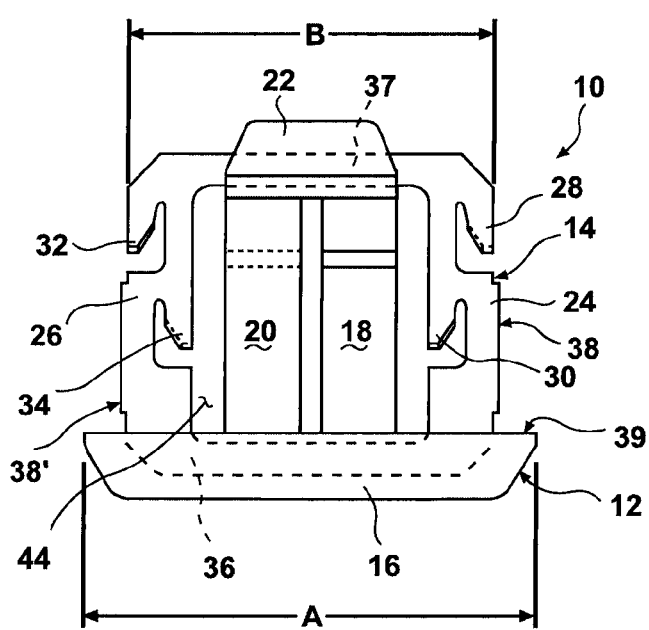
FIG. 2 is a front elevational view of the fastener assembly of FIG. 1.

Referring to FIG. 2, first and second sides 24, 26 define parallel first and second perimeter members. First and second sides 24, 26 are both perpendicularly oriented with respect to a third perimeter member or third portion 36 and a fourth perimeter member or fourth portion 37. A central aperture 44 is defined by the first, second, third, and fourth perimeter members 24, 26, 36, 37. Third perimeter member or portion 36 of metal insert portion 14 is completely embedded in head 16 of molded portion 12 during a molding process such as an injection molding process, and fourth perimeter member or portion 37 is partially embedded in connecting end 22 during the molding process. Tabs 38, 38' provide outward facing extensions of opposed sides 24, 26. Head 16 has a width "A" which is greater than a width "B" of metal insert portion 14 so that a planar surface 39 of head 16 from which the metal insert 14 projects which extends past both opposed sides 24, 26 provides a contact surface defining a maximum insertion depth for fastener 10. The oppositely directed first and second elastically deflectable wings 18, 20 are each homogenously connected to both the lead end 22 and the head or end member 16 and are elastically deflectable in the central aperture 44.

Figure 3:
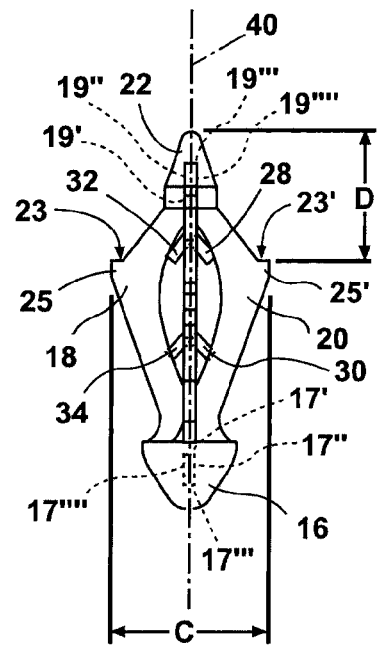
FIG. 3 is a side elevational view of the fastener assembly of FIG. 2.

Referring to FIG. 3, deflectable wings 18, 20 have a maximum spacing dimension "C" in the non-deflected state between a maximum extending portion 25, 25' of each of the first and second deflectable wings 18, 20. Stepped engagement faces 23, 23' are both positioned at a spacing dimension "D" from a free end of connecting end 22, and both define planar surfaces which are oriented transverse to a longitudinal axis 40 of fastener 10. Each of first, second, third, and fourth barbs 28, 30, 32, 34 have a barbed or free end directed toward head 16.

The third perimeter member 36 has contiguous third perimeter surfaces 17', 17'', 17''', 17''''. The fourth perimeter member 37 has contiguous fourth perimeter surfaces 19', 19'', 19''', 19''''. The head member 16 entirely encapsulates the third perimeter member 36 and therefore has polymeric material in contact with all of the third perimeter surfaces 17', 17'', 17''', 17''''. The connecting member or end 22 has the fourth perimeter member 37 partially embedded therein such that polymeric material of the connecting end 22 is in contact with each of the fourth perimeter surfaces 19', 19'', 19''', 19''''.

Figure 4:
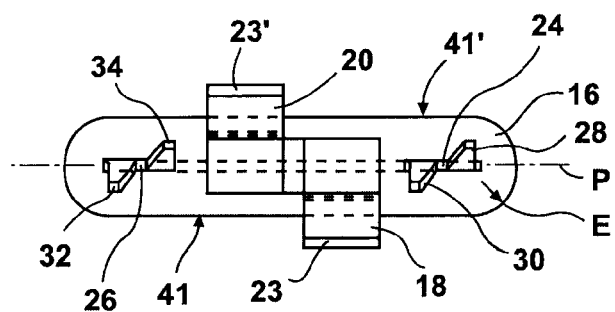
FIG. 4 is a bottom plan view of the fastener assembly of FIG. 2.

Referring to FIG. 4, in the non-deflected, as-molded condition, first deflectable wing 18 extends outwardly beyond a first perimeter face 41 of head 16, and second deflectable wing 20 extends oppositely with respect to first deflectable wing 18 and outwardly beyond a second perimeter face 41' of head 16 which is oriented parallel to first perimeter face 41. Stepped engagement faces 23, 23' define furthest outward portions of first and second deflectable wings 18, 20 with respect to first and second perimeter faces 41, 41'. First and second barbs 28, 30 are positioned outward (to the right as viewed in FIG. 4) of first deflectable wing 18. Third and fourth barbs 32, 34 are positioned outward (to the left as viewed in FIG. 4) of second deflectable wing 20. Second and third barbs 30, 32 can be stamped or punched from material of first and second sides 24, 26, respectively, and then bent or formed to be commonly directed with first deflectable wing 18 toward first perimeter face 41 of head 16. First and fourth barbs 28, 34 can be stamped or punched from material of first and second sides 24, 26, respectively, and then bent or formed to be commonly directed with second deflectable wing 20 toward second perimeter face 41' of head 16.

The first and second barbs or bite members 28, 30 are homogenously connected to the third perimeter member 24 and are bent or formed to be oppositely oriented with respect to a plane "P" defined by the third and fourth perimeter members 24, 26, and are both pointed or directed toward the head or end member 16. The third and fourth barbs or bite members 32, 34 are homogenously connected to the fourth perimeter member 26 and are bent or formed to be oppositely oriented with respect to plane "P" and are both pointed or directed toward the head or end member 16.

Figure 5:
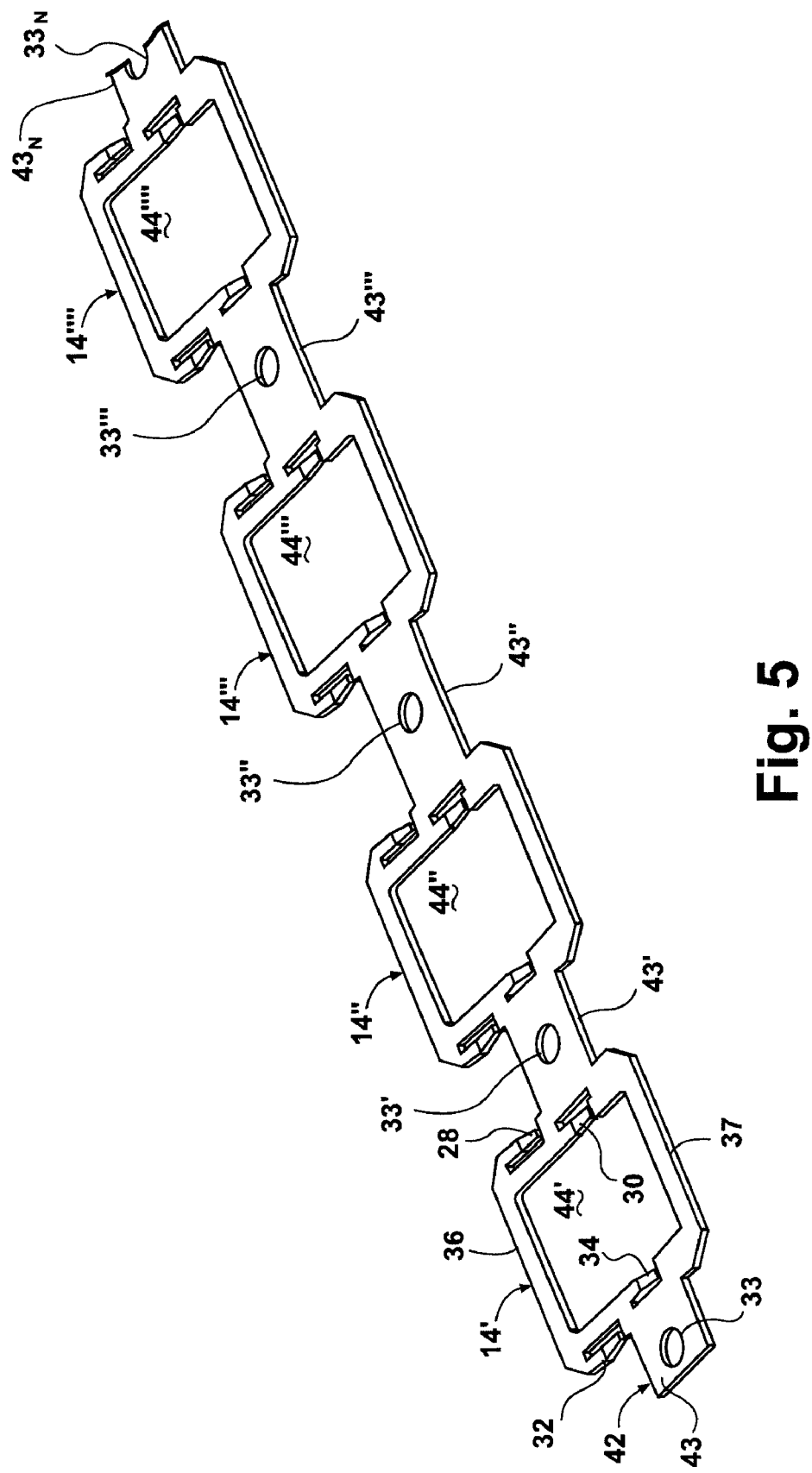
FIG. 5 is a top perspective view of a strip having multiple metal insert portions each adapted for the fastener assembly of FIG. 1.

Referring to FIG. 5, multiple metal insert portions 14, identified as insert portions 14', 14'', 14''', 14'''' are created from a reel or strip 42 of metal which is punched or stamped to the desired shapes. The multiple insert portions 14', 14'', 14''', 14'''' are initially homogenously joined by connecting members 43', 43'', and 43''' which can continue to connecting member 43n of a predetermined value which is not limiting to the present invention. Various stamping, bending, piercing, and/or similar operations are performed to create the first and second sides 26, 28, the first, second, third, and fourth barbs 28, 30, 32, 34, the first and second portions 36, 37, and central aperture 44 (shown as apertures 44', 44'', 44''', 44''''). Strip 42 and insert portions 14', 14'', 14''', 14'''' can be a steel material such as stainless steel to eliminate the need to plate or corrosively protect the metal parts. The metal material of insert portion 14 can also be spring steel. Each connecting member shown in the partial configuration of FIG. 5 as connecting members 43, 43', 43'', 43''', and 43$_N$ can also include a pilot aperture 33, 33', 33'', 33''', 33$_N$. Pilot apertures 33 are provided to help align strip 42 in a mold (not shown).

Figure 6:
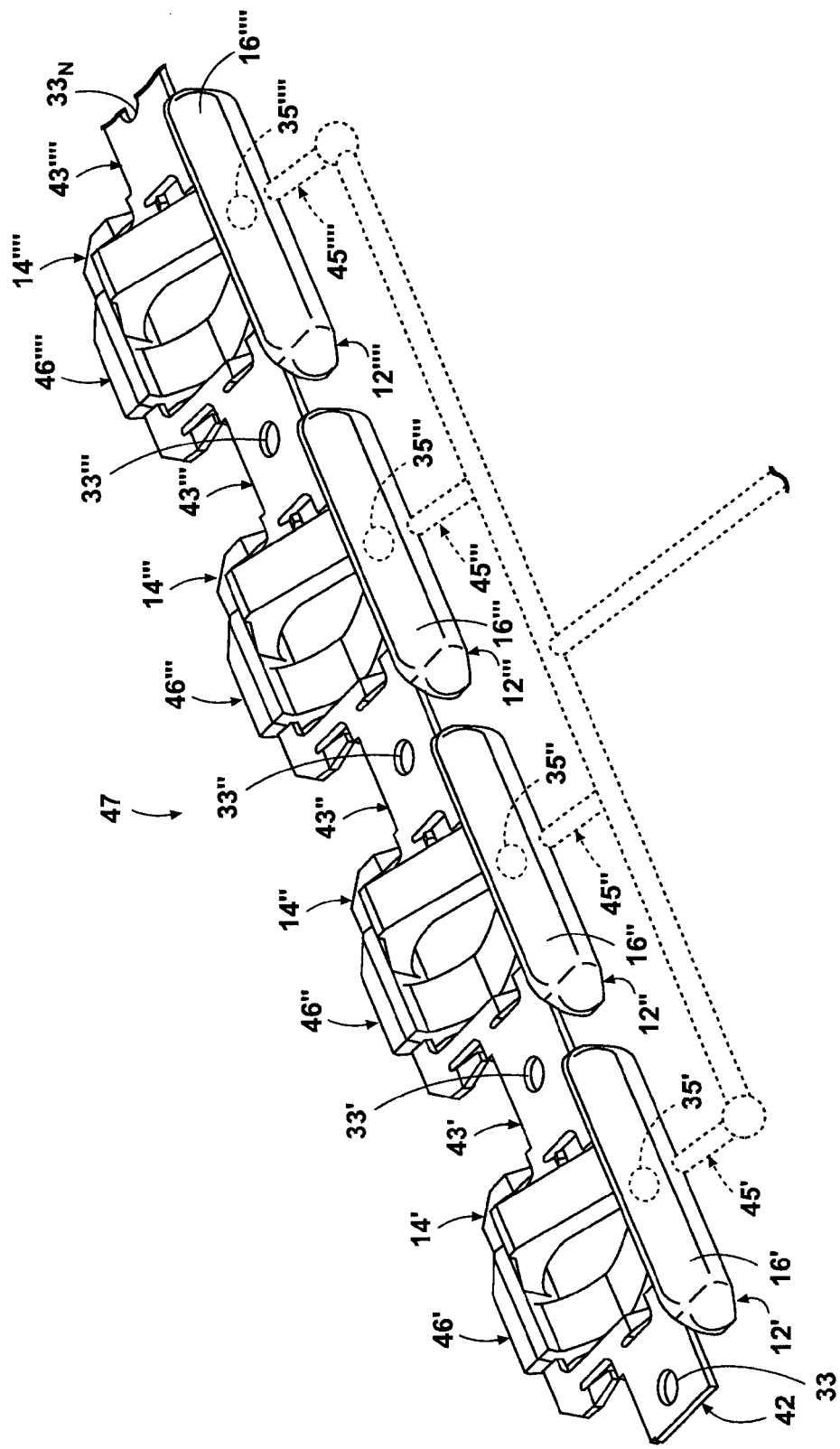
FIG. 6 is a top perspective view of the strip of FIG. 5 having a molded portion coupled to each of the metal insert portions.

Referring to FIG. 6, strip 42 is then aligned using pilot apertures 33, 33', 33'', 33''', 33$_N$ in a multiple-mold or die (not shown for clarity) which can have separate feed lines 45', 45'', 45''', 45'''' associated with each of the insert portions 14', 14'', 14''', 14''''. A polymeric resin such as polyamide is heated and injected into each mold section to produce individual fastener subassemblies 46', 46'', 4''', and 46''. According to additional embodiments, feed lines 45', 45'', 45''', 45'''' of a runner injection system can be eliminated and replaced by a hot drop system to fill each of the molded portions 12', 12'', 12''', 12'''' which are indicated by individual injection marks 35', 35'', 35''', 35'''' in heads 16', 16'', 16''', 16''''. Each of the fastener subassemblies 46', 46'', 46''', and 46'''' are integrally connected by the connecting members 43', 43'', and 43''' defining an assembly 47.

Figure 7:
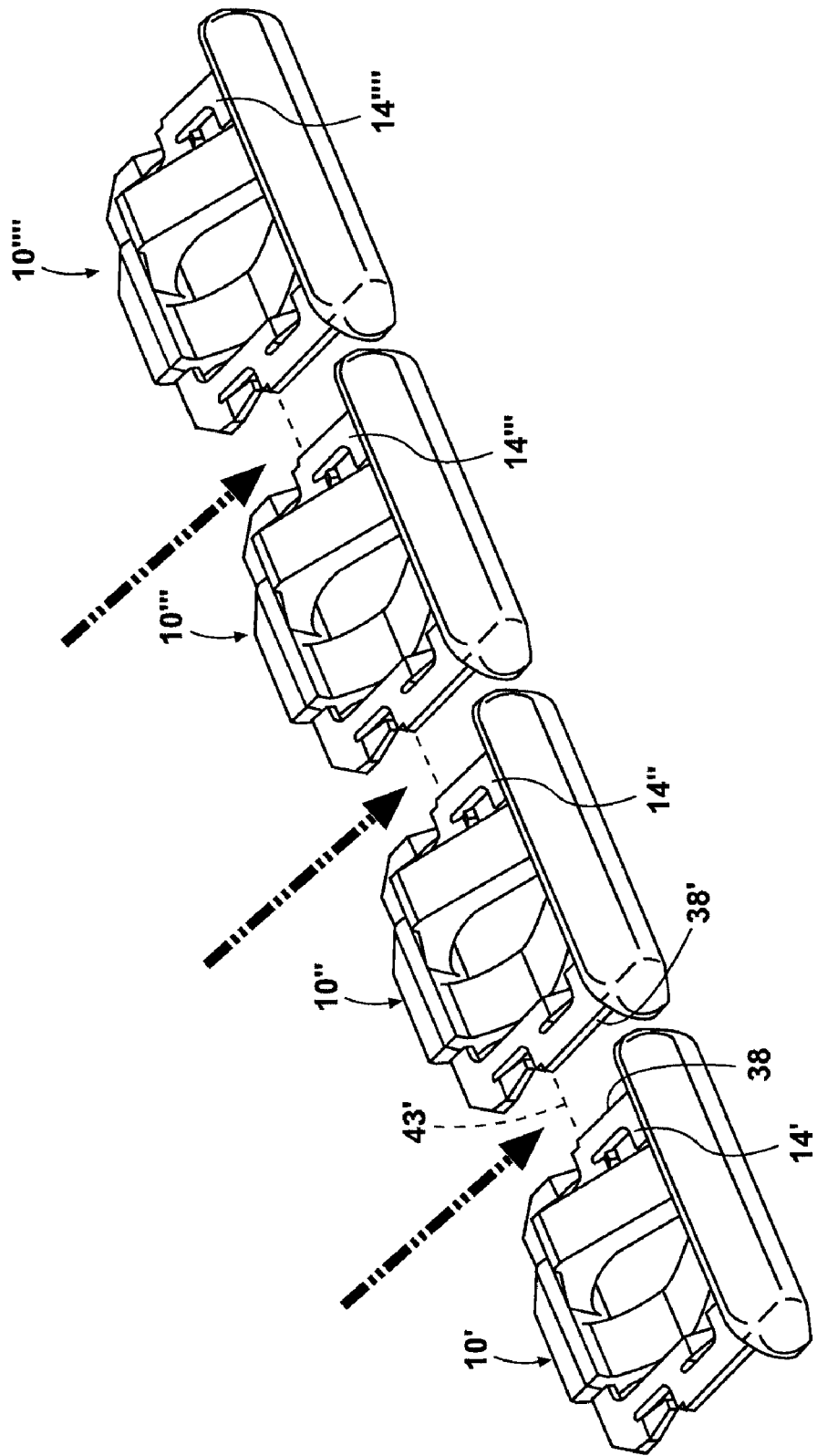
FIG. 7 is a top perspective view similar to FIG. 6 following removal of joining sections of the strip.

Referring to FIG. 7, the assembly 47 of FIG. 6 is separated into individual fastener assemblies 10', 10'', 10''', etc. by a trimming, shearing, stamping, or similar operation to remove connecting members 43. This operation also creates each of the tabs 38, 38' which are retained to provide parallel and planar outermost side edges of the insert portions 14', 14'', 14''', 14'''.

Figure 8:
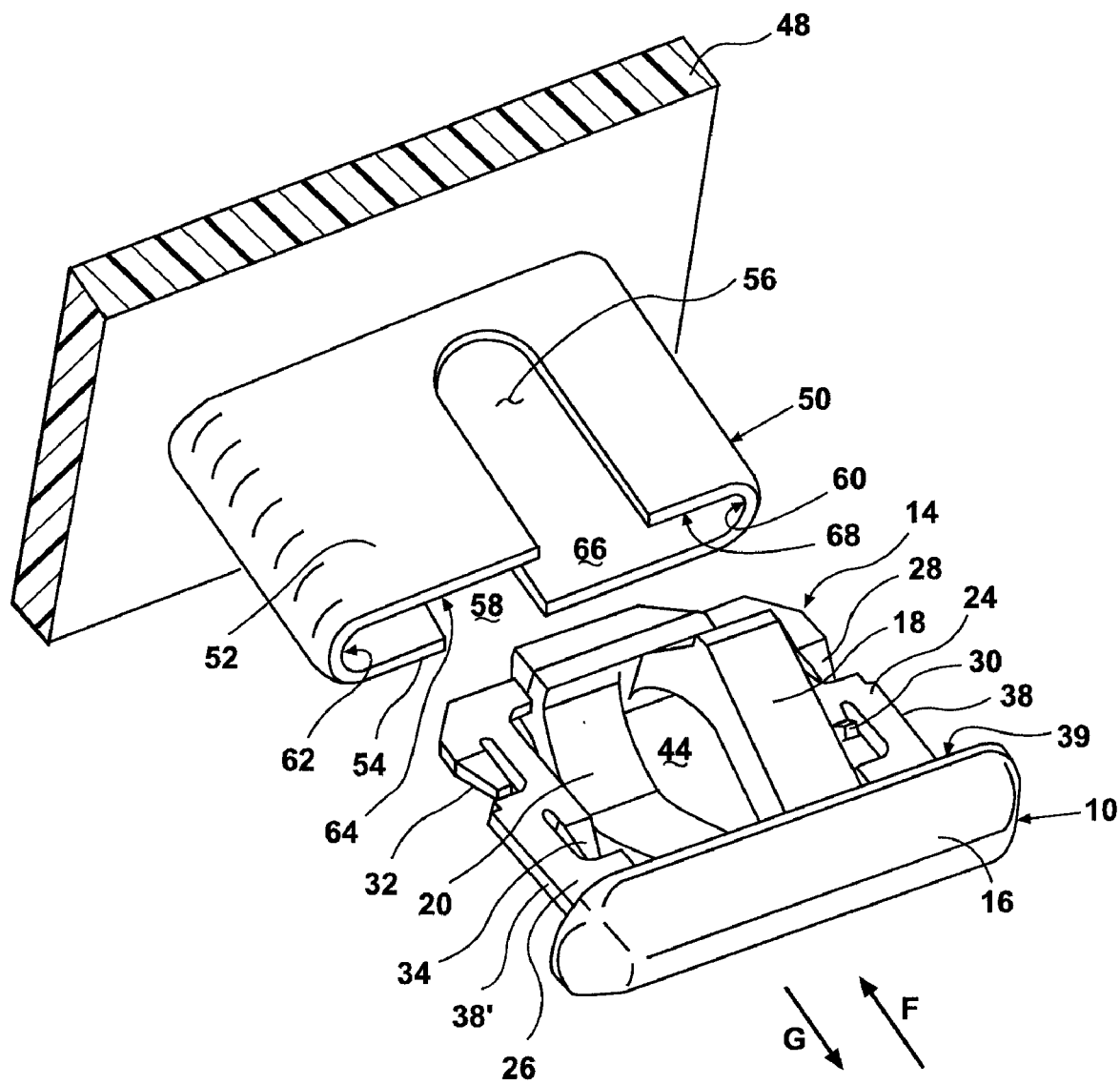
FIG. 8 is a front perspective view of a fastener assembly of FIG. 1 aligned for installation into a molded polymeric receiving member of a trim component.

Referring to FIG. 8, a portion of an automobile vehicle trim member 48 has a dog-house or receiving member 50 co-molded with the trim member 48. Receiving member 50 has opposed first and second walls 52, 54 each having a first or second open ended longitudinal slot 56, 58 sized to slidably receive one of the first or second deflectable wings 18, 20 in an installation direction "F". First and second deflectable wings 18, 20 can elastically deflect toward each other within central aperture 44. Receiving member 50 also has opposed first and second inner curved walls 60, 62 which homogenously connect the opposed walls 52, 54. The tabs 38, 38' and first and second sides 24, 26 of insert portion 14 are completely encased by opposed walls 52, 54 and first and second inner walls 60, 62 when fastener assembly 10 is inserted into receiving member 50 in installation direction "F". The barbs 28, 30, 32, 34 of insert portion 14 are oriented to engage with inner faces 64, 66 of walls 52, 54 to physically engage fastener assembly 10 to receiving member 50 when planar surface 39 of head 16 contacts an end face 68 of receiving member 50. After full engagement of fastener assembly 10 with receiving member 50 (shown in reference to FIG. 9), the barbs 28, 30, 32, 34 resist removal of fastener assembly 10 in a removal direction "G".

Figure 9:
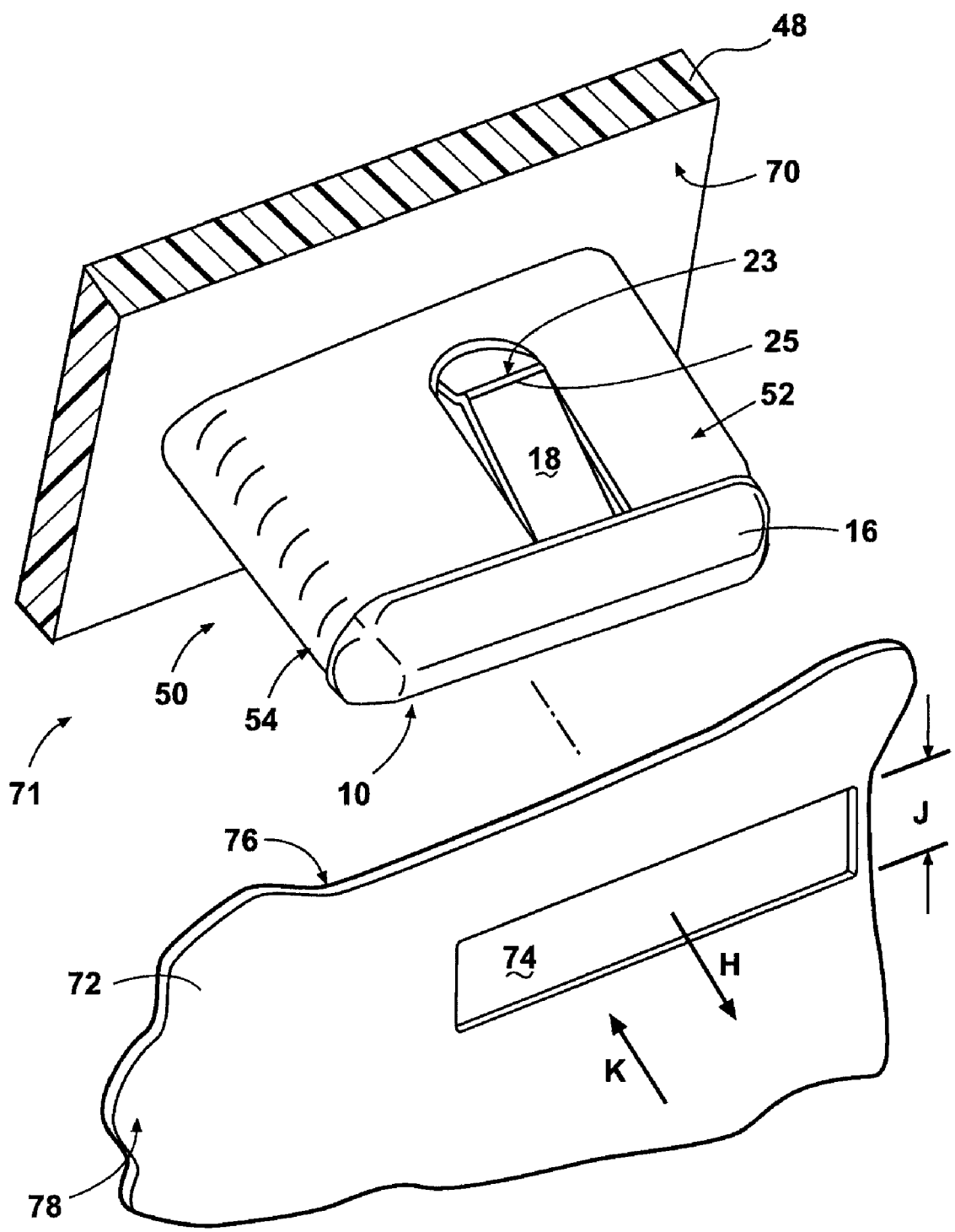
FIG. 9 is a front perspective view of a fully engaged fastener assembly and receiving member sub-assembly aligned for installation into a vehicle body panel.

Referring to FIG. 9, a fully engaged position of fastener assembly 10 with receiving member 50 occurs when head 16 abuts receiving member 50. When positioned in the fully engaged position, the stepped engagement faces 23, 23' (only stepped engagement face 23 is visible) of first and second deflectable wings 18, 20 (only first deflectable wing 18 is visible in this view) extend outwardly of the opposed first and second walls 52, 54 of receiving member 50. The stepped engagement faces 23, 23' are directed toward a surface 70 of trim member 48 which has receiving member 50 extending therefrom. In the fully engaged position, a sub-assembly 71 is created.

The sub-assembly 71 of fastener assembly 10 and receiving member 50 can be releasably connected to a vehicle panel 72. Vehicle panel 72 has an elongated aperture 74 sized to slidaby receive receiving member 50. Referring again to FIG. 3, maximum spacing dimension "C" between extending portions 25, 25' is greater than a height "J" (shown in FIG. 9) of elongated aperture 74. When head 16 and receiving member 50 are inserted through elongated aperture 74, the reduced height "J" of elongated aperture 74 causes first and second deflectable wings 18, 20 to elastically deflect toward each other until extending portions 25, 25' pass completely through elongated aperture 74. At this time, the first and second deflectable wings 18, 20 move away from each other due to the biasing force created when the first and second deflectable wings 18, 20 were elastically deflected. When receiving member 50 is fully inserted into elongated aperture 74, first panel surface 76 of vehicle panel 72 can be in contact with or spaced at a predetermined distance from surface 70 of trim member 48. Also at this time, the stepped engagement faces 23, 23' of extending portions 25, 25' contact a second panel surface 78 of vehicle panel 72 to prevent removal of the sub-assembly 71 from elongated aperture 74 until first and second deflectable wings 18, 20 are deflected toward each other or until a force acting in a removal direction "K" is sufficient to overcome the elastic biasing force of first and second deflectable wings 18, 20.

Figure 10:
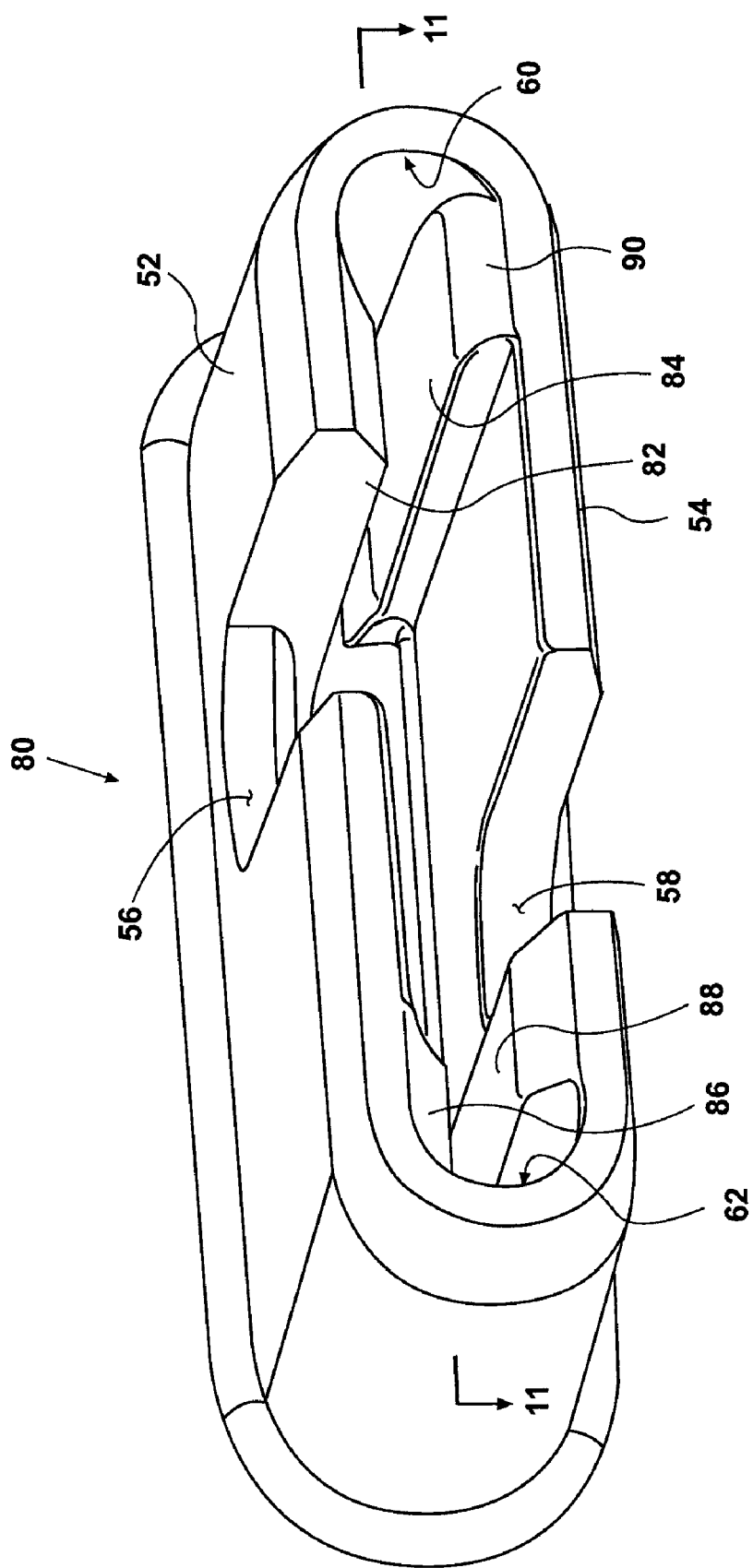
FIG. 10 is a front perspective view of another embodiment of a dog-house assembly of the present disclosure.
Figure 11:
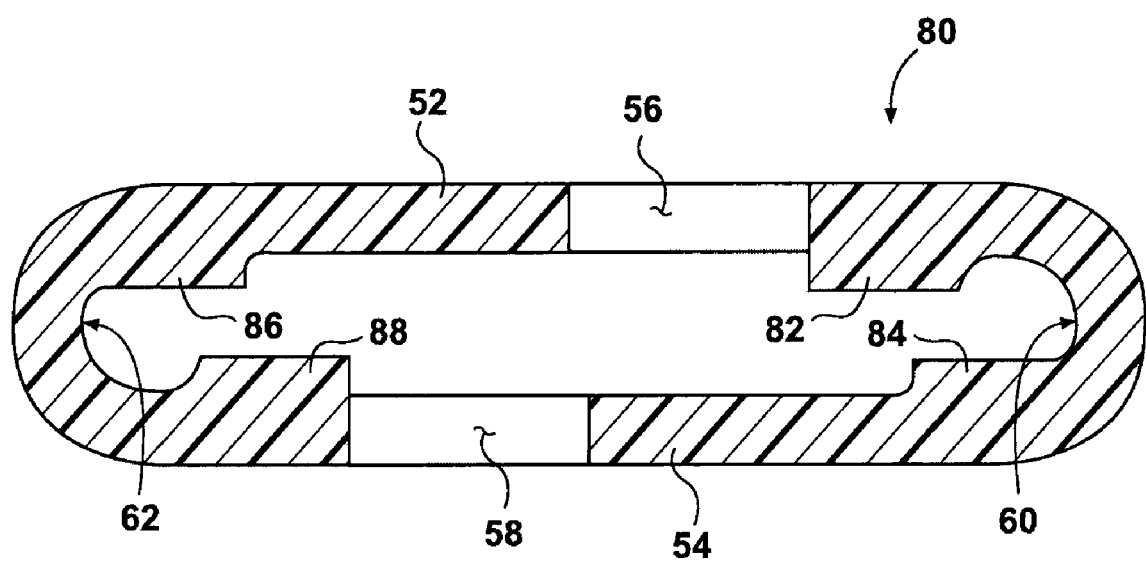
FIG. 11 is a cross sectional front elevational view of the dog-house assembly taken at section 11 of FIG. 10.

Referring to FIGS. 10 and 11 and again to FIGS. 2 and 8, according to additional embodiments, a dog-house assembly or receiving member 80 is modified from receiving member 50 to include four internal raised ribs including first, second, third, and fourth raised ribs 82, 84, 86, 88. First and third raised ribs 82, 86 are homogenous extensions of first wall 52 and second and fourth raised ribs 84, 88 are homogenous extensions of second wall 54. First raised rib 82 is spaced from first inner curved wall 60 and second raised rib 84 is homogenously connected to first inner curved wall 60. Third raised rib 86 is homogenously connected to second inner curved wall 62 and fourth raised rib 88 is spaced from second inner curved wall 62. The first, second, third, and fourth raised ribs 82, 84, 86, 88 are co-molded together with receiving member 80 and are individually positioned to provide frictional engagement (or bite) surfaces for individual ones of the first, second, third, or fourth bite members 28, 30, 32, 34. When fastener assembly 10 is received within receiving member 80, first bite member 28 frictionally engages with second raised rib 84, second bite member 30 frictionally engages with first raised rib 82, third bite member 32 frictionally engages with fourth raised rib 88, and fourth bite member 34 frictionally engages with third raised rib 86.

Fastener assemblies of the present invention provide several advantages. The use of a receiving member 50 co-molded with a trim component encloses the metal and barbed engagement features of the fastener assembly preventing damage to vehicle surface finishes from contact between the metal insert portion 14 and the vehicle panel. The polymeric deflectable wings which extend beyond the perimeter panels of the trim component receiving member engage one face of a vehicle panel while a surface of the trim member contacts the opposite face of the vehicle panel. The barbs are pre-formed prior to the plastic portion being applied to reduce manufacturing steps. The shape of the trim component receiving member 50 having double enclosing walls is stronger than a conventional single flat blade commonly used for trim members in conjunction with a conventional U-shaped trim engagement fastener. The fastener assemblies of the present invention should be installed in the trim component prior to shipment of the trim component, which also protects the fastener assembly from damage during shipment/handling because the fastener is encapsulated within the rib structure of the trim component receiving member. Fastener assemblies of the present invention can be installed in either metal or polymeric vehicle body panels and provide serviceability for multiple installations/removals. Using a common stamped metal member allows the metal member to be inserted into a variety of plastic molds to provide multiple fastener designs/applications, which reduces fastener costs.

What is claimed is:

1. A metal/plastic fastener, comprising:
a metal body portion having parallel first and second perimeter members perpendicularly oriented with respect to third and fourth perimeter members, and a central aperture created by the first, second, third, and fourth perimeter members; and
a polymeric portion including:
an end member having the third perimeter member completely embedded therein;
a lead member having a portion of the fourth perimeter member embedded in the lead member; and
oppositely directed first and second elastically deflectable wings each homogenously connected to both the lead member and the end member and elastically deflectable in the central aperture.

2. The metal/plastic fastener of claim 1, further including:
first and second bite members homogenously connected to the first perimeter member and oppositely oriented with respect to a plane defined by the first and second perimeter members and both directed toward the end member; and
third and fourth bite members homogenously connected to the second perimeter member and oppositely oriented with respect to the plane defined by the first and second perimeter members and both directed toward the end member.

3. The metal/plastic fastener of claim 1, wherein each of the first and second deflectable wings further include a stepped engagement face created proximate to a maximum extended portion having the stepped engagement face directed toward the lead member.

4. The metal/plastic fastener of claim 1, further including a planar surface of the end member from which the metal body portion projects and which extends outwardly of the first and second perimeter members.

5. The metal/plastic fastener of claim 1, wherein the end member includes parallel first and second perimeter faces, wherein in a non-deflected condition, the first deflectable wing extends outwardly beyond the first perimeter face and the second deflectable wing extends oppositely with respect to the first deflectable wing outwardly beyond the second perimeter face.

6. A metal/plastic fastener, comprising:
a metal body having parallel first and second perimeter members perpendicularly oriented with respect to third and fourth perimeter members, the first, second, third, and fourth perimeter members defining a central aperture;
the third perimeter member having contiguous third perimeter surfaces;
the fourth perimeter member having contiguous fourth perimeter surfaces;
a polymeric member including:
a head member entirely encapsulating the third perimeter member and in contact with all of the third perimeter surfaces;
a connecting member having the fourth perimeter member partially embedded in the connecting member; and
oppositely directed first and second elastically deflectable wings each homogenously connected to both the head member and the connecting member.

7. The metal/plastic fastener of claim 6, wherein the first perimeter member further includes first and second barbs oppositely oriented with respect to the first perimeter member and both directed toward the head member.

8. The metal/plastic fastener of claim 7, wherein the second perimeter member further includes third and fourth barbs oppositely oriented with respect to the second perimeter member and both directed toward the head member.

9. The metal/plastic fastener of claim 6, wherein each of the first and second elastically deflectable wings further include a stepped engagement face defining a planar surface, the stepped engagement face created proximate to a maximum extended portion and having the stepped engagement face directed toward the connecting member.

10. The metal/plastic fastener of claim 9, wherein the head member further includes a planar surface oriented substantially parallel to the stepped engagement face of each of the first and second elastically deflectable wings.

11. The metal/plastic fastener of claim 6, wherein the connecting member is in contact with each of the fourth perimeter surfaces.

* * * * *